(No Model.)

T. H. BESSE.
ICE CREAM FREEZER.

No. 464,169. Patented Dec. 1, 1891.

Witnesses.
Harriet Johnson
Henry C. Ashbery

Thomas H. Besse Inventor.
By James Sampster
Attorney.

UNITED STATES PATENT OFFICE.

THOMAS H. BESSE, OF BUFFALO, NEW YORK.

ICE-CREAM FREEZER.

SPECIFICATION forming part of Letters Patent No. 464,169, dated December 1, 1891.

Application filed July 24, 1891. Serial No. 400,530. (No model.)

*To all whom it may concern:*

Be it known that I, THOMAS H. BESSE, a citizen of the United States, residing in Buffalo, in the county of Erie and State of New York, have invented certain new and useful Improvements in Ice-Cream Freezers, of which the following is a specification.

My invention relates to that class of ice-cream freezers in which the cream is taken up and frozen on the periphery of a rotary cylinder containing the refrigerating material and removed therefrom by means of a scraper as the face of the cylinder moves under it, all of which will be fully and clearly hereinafter described and claimed, reference being had to the accompanying drawings, in which—

Figure 1:
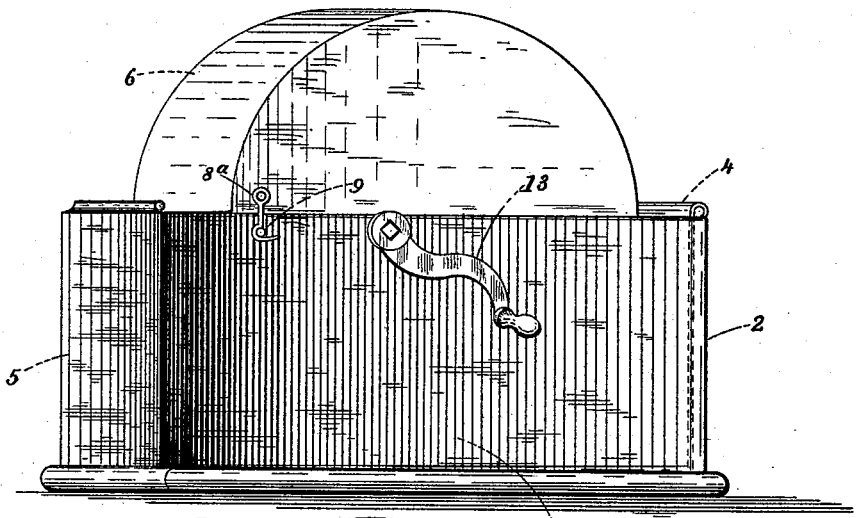
Figures 2, 3, 4:
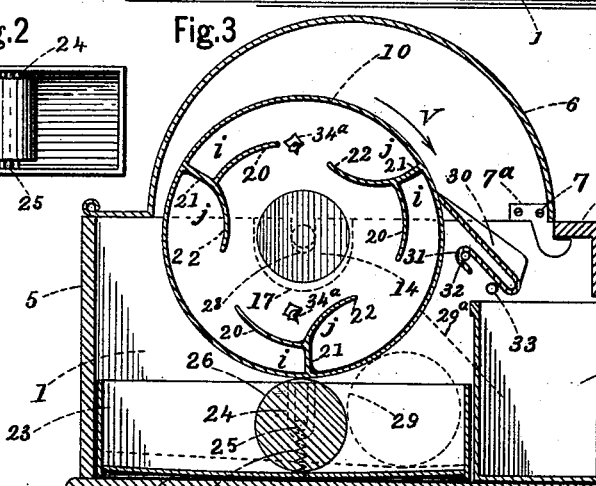
Figure 5:
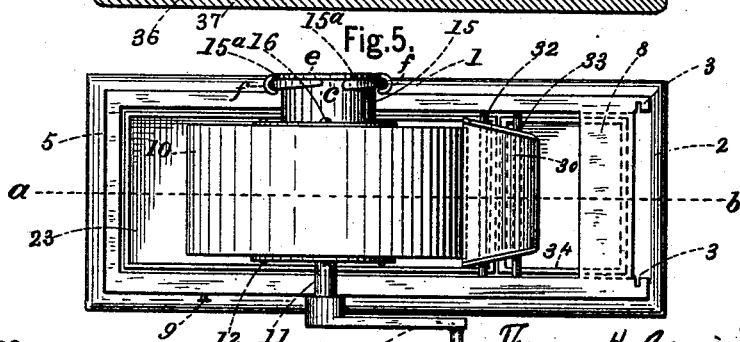

Figure 1 is a perspective view of the freezer complete. Fig. 2 is a top plan view of the removable cream pan or vessel, show a similar view of its transfer-roller for taking up the cream and transferring it to the refrigerating-cylinder. Fig. 3 is a vertical longitudinal section through the whole device in or about line $a\ b$, Fig. 5, showing the interior construction of the refrigerating-cylinder, the pan or vessel for holding the cream to be frozen and its transfer-roller, the receptacle for receiving the cream after being frozen, and the scraper for taking the frozen cream from the refrigerating-cylinder and conducting it to the receiving-vessel, showing also the outer case for inclosing the whole. Fig. 4 is a face view of the cap for closing the opening in the side of the refrigerating-cylinder after receiving its charge of refrigerating material. Fig. 5 is a top plan view showing everything but the removable top or inclosing-case covering and the vertically-sliding end door.

The outer case consists of a box 1, preferably made of wood, but may be of any other suitable material. This box 1 is open at the top, and at the end 2 it is provided with two vertical grooves or slideways 3 (shown in Fig. 5) to receive a vertical sliding door 4, the opposite end 5 of the box being closed.

The removable cover 6 is secured in place when put on by means of metallic catches $7^a$, secured to the interior of the cover by screws 7, which slip under the cross-piece 8 at the end 2 of the box 1. At the opposite end is a pivoted hook-catch $8^a$, which catches over a pin 9 near the end 5 of the box. In this way the cover is made easily removable and is rigidly held to its place when put on.

The refrigerating-cylinder 10 is preferably made of sheet metal; but any other well-known suitable material may be used. A short shaft 11 is rigidly secured to one side by means of a flanged portion secured by screws or rivets 12 thereto. The outer end of this shaft carries the handle 13, by which the cylinder is turned. At the opposite side of the refrigerating-cylinder is an opening 14, (shown in Fig. 3,) through which ice and salt or other suitable refrigerating material are put in for freezing the cream. The diameter of this opening 14 is about three inches, more or less, sufficiently large to admit pieces of ice of any desired size or to insert the hand, if necessary, for cleaning, &c.

Directly opposite the opening 14, outside of the refrigerating-cylinder 10, is a flanged collar 15, made large enough to surround the opening 14. It is secured by means of screws or rivets 16, passing through the flange and through the side of the cylinder. This collar 15 is made long enough to act as a bearing-shaft for one side of the refrigerating-cylinder and rests in a substantially semicircular opening shown by the dotted lines 17 in Fig. 3.

On the outer end of the collar 15 are two or more projecting ribs $15^a$, which extend nearly around it, leaving openings $c$ between them. These ribs are made slightly wedge-shaped, so as to act as a screw when the cover $e$ is put on.

The cover $e$ is provided with two curved overlapping hook portions $f$, (see Figs. 4 and 5,) which pass through the openings $c$ between the ends of the ribs $15^a$, so that when the cover $e$ is turned they catch over and draw it tightly and closely to the end of the collar. To insure a close tight joint when the cover is put on, a soft-rubber ring may be interposed in any well-known way between them. From this construction it will be noticed that the refrigerating-cylinder is made easily removable, all that is necessary to do being to take off the cover 6 and then lift it up out of its bearings.

Within the refrigerating-cylinder is a series of curved plates 22, connected directly to the inner sides of the peripheral case of the refrigerating-cylinder, and to each of the curved plates 22 is rigidly attached, at or near the points 21, a curved plate 20. The curved plates 20 and 22 extend in nearly opposite directions from each other, substantially as shown in Fig. 3. I am aware that a single series of curved plates have been used on the interior of a refrigerating-cylinder; but I not am aware that a double series of curved plates have ever been attached to the inner sides of an ice cream refrigerating-cylinder (or any other cylinder) for the purpose of keeping the material as close to the periphery as possible. These plates extend clear across the refrigerating-cylinder from side to side and are rigidly connected in any well-known way. Their object is to keep the refrigerating material as close to the periphery of the refrigerating-cylinder case as possible, and will be more clearly explained when describing the operation of the device.

Below the refrigerating-cylinder is a removable cream-vessel 23. This vessel 23 is easily removable by taking out the door 4, as before mentioned.

On each side of the cream-vessel 23, directly opposite each other, is a U-shaped bearing-box 24, into which fit the bearings 25 of the removable transfer-roller 26, which nearly touches the bottom of the pan or vessel 23. It will be noticed that the refrigerating-cylinder rests on the top of this transfer-roller 26, so that its collar 15 and shaft 11 do not rest down in their bearings, but are kept slightly above them. (Shown by the dotted lines 17 and 28, Fig. 3.) The object of this construction is to insure a close contact between the refrigerating-cylinder and the transfer-roller, so that when turning the cylinder both will turn together. If desired, the transfer-roller may be made larger, so as to bring it nearer the scraper, substantially as shown by the dotted-line circle 29 in Fig. 3, and, if required, the scraper may be brought down to 29ª, nearer to the transfer-roller, so that the cream may pass as far as possible on the periphery of the refrigerating-cylinder.

The scraper 30 is made of any suitable sheet metal—tin, for instance—or other material may be used. It is made in an S form, substantially as shown in Fig. 3. The upper hook-bend 31 passes around a cross-rod 32, which is rigidly secured to the box, and the lower bent portion rests on a cross-rod 33. (See Figs. 3 and 5.) This construction makes the scraper elastic and allows it to spring against the face of the refrigerating-cylinder with sufficient force to hold it closely thereto, and, furthermore, the greatest weight of the scraper being below, the rod 32 holds it in its place when put on, so that the cylinder can be either removed or put on without disturbing it; but it is easily removable when required, as will be readily seen.

At the front of the cream-pan is a receptacle 34 to receive the cream after it is frozen and taken by the scraper from the refrigerating-cylinder.

The operation of the invention is as follows: Ice and salt being put in the usual way into the refrigerating-cylinder and the cap or cover e being put on, as hereinbefore mentioned, the refrigerating-cylinder is put in place, so as to rest on and be supported by the transfer-roller 26. The cover 6 is now put on and secured. The refrigerating-cylinder is now turned by the handle 13, (the cream-vessel 23 being filled with cream.) The transfer-roller as it turns brings the cream to the refrigerating-cylinder, so that its periphery receives a thin film of cream, which freezes almost instantly, and the scraper takes it off as the refrigerating-cylinder turns and delivers it into the ice-cream receptacle. The advantage of a transfer-roller is that the cream-vessel may be filled full without coming in contact with the refrigerating-cylinder, and it will take up only enough to give the required thickness of cream for quickly freezing on the refrigerating-cylinder whether the cream-vessel be full or only partly full. The curved plates 20 and 22, as the cylinder turns in the direction of the arrow V, (shown in Fig. 3,) cause the ice and salt to keep as near as possible to the periphery. For instance, any ice 34ª that should fall out of the pocket i between the ends of the plate 20 and 22 would fall through onto the opposite side of one of the plates 20 or 22, and as the cylinder turns would again drop between a plate 20 and 22, and then fall into a pocket i again. The general tendency of the ice to fall is from the pockets i to the pockets j. In this way the bulk of the ice is always kept as near to the periphery as possible, where it is required.

I am aware that heretofore curved plates radiating from the center of a refrigerating-cylinder have been used; but it is obvious that such construction will not distribute the ice around the periphery of the cylinder and keep it continually in motion there, as the construction I have described will do. It will be noticed that the bottom 36 of the cream-vessel is curved. The object of this is that the transfer-roller may be able to take up all the cream in the pan when operating the device.

If desired, springs 37, as an equivalent, substantially as shown in Fig. 3, may be put under the journals of the transfer-roller to force it up against the refrigerating-cylinder; but I prefer the construction shown. The removable transfer-roller 26 may also be supported in bearing-boxes 25, secured in each side of the case or box; but when the bearing-boxes are arranged in this way they would have to be located high enough to let the bearings 25 extend above and over the sides of the vessel, so that the transfer-roller in this instance would project down into the cream a little less than one-half of its diameter, (the bearings 25 taking up a portion of this room,) so that the bottom of the cream-pan would have to be raised up to or nearly to the roller. Consequently the cream-pan could not be made to hold more than one-half of the amount of cream. Otherwise it would answer the purpose as well as the construction hereinbefore described, which construction I prefer for the reason above given. In this way the cream-vessel may be filled nearly to the top of the transfer-roller, as I have hereinbefore mentioned, and still the thickness of the layer of cream deposited on the refrigerating-cylinder 10 will at all times be the same until all the cream is removed from the cream-vessel.

It will be noticed that the weight of the refrigerating-cylinder rests upon the transfer-roller, so as to keep them in close contact all the time they are operating, and thus cause them to turn together. The tendency of this operation with any material that did not harden the instant it struck the surface of the cylinder would be to transfer and roll out so thin a film of material on the large cylinder as to be practically useless for any purpose; but with a refrigerating-cylinder it is different. The instant the cream touches it it freezes and hardens, so that the cylinder as it turns rolls over the transfer-roller and carries with it a hardened film of frozen cream sufficiently hard to support the weight of the refrigerating-cylinder, which film would go on increasing in thickness were it not taken off by the scraper nearly as fast as it is formed. I am aware that a transfer-roller has heretofore been used, but not in contact with and operated by the receiving cylinder or roller, or the roller it is adapted to transfer the material to; but the transfer-roller has been operated separate from the receiving roller or cylinder by a belt or other equivalent means, so as to carry the material up to it. I therefore do not claim such construction, broadly; but What I do claim is—

1. In an ice-cream freezer, the combination of a refrigerating-cylinder for holding the refrigerating material mounted in bearings to keep it in position in the frame, a handle for turning it, a transfer-roller mounted in bearings within the cream-box and upon which the refrigerating-cylinder rests and is supported slightly above its bearings, and a scraper for taking the cream from the periphery of the refrigerating-cylinder as it is formed, substantially as described.

2. In an ice-cream freezer, the combination of a refrigerating-cylinder having an opening in one side to receive the refrigerating material and mounted in suitable bearings in the frame, so as to rest and be supported on a transfer-roller, a handle for turning it, a transfer-roller in close contact with and operated by the movement of the periphery of the refrigerating-cylinder, a box for holding the cream, within which the transfer-roller is mounted in suitable bearings, a scraper for taking the frozen cream off from the periphery of the refrigerating-cylinder as it turns, and a receptacle for receiving it, substantially as described.

3. In an ice-cream freezer, the combination of a refrigerating-cylinder, a means, substantially as above described, for keeping the refrigerating material to the peripheral case of the refrigerating-cylinder, the refrigerating-cylinder being mounted in bearings to keep it in position in the frame and provided with a handle for turning it, a transfer-roller mounted in bearings within the cream-box and upon which the refrigerating-cylinder rests and is supported slightly above its bearings, and a scraper for taking the cream from the periphery of the refrigerating-cylinder as it is formed, substantially as described.

4. In an ice-cream freezer, the combination, with the refrigerating-cylinder, of a series of curved plates 22, extending in from the peripheral case radially toward the center and then in a curve which inclines between the center and the peripheral case, and a series of plates 20, attached to the plates 22, extending in nearly an opposite direction, for keeping the refrigerating material in toward the peripheral case, substantially as described.

5. In an ice-cream freezer, the combination, with the refrigerating-cylinder, of a series of plates projecting inward from the inner side of the peripheral case and terminating in a double series of plates projecting in substantially opposite directions therefrom, so as to form pockets $i$ and $j$, into which the refrigerating material is continually thrown against the inner sides of the peripheral case while the refrigerating-cylinder is being operated, substantially as described.

6. In an ice-cream freezer, the combination, with the refrigerating-cylinder, of a removable S-shaped scraper formed in one piece, a cross-bar 33, upon which the bent portion rests, and a hook-bend 31 on the scraper, which clasps over the cross-bar 32, substantially as and for the purposes described.

THOMAS H. BESSE.

Witnesses:
JAMES SANGSTER,
NOBLE T. BARNES.